United States Patent [19]

Graefe

[11] 4,211,545

[45] Jul. 8, 1980

[54] METHOD AND APPARATUS FOR PREPARING HIGH GRADE FERTILIZER

[76] Inventor: Gernot Graefe, Bergstrasse 6, A-7082 Donnerskirchen, Austria

[21] Appl. No.: 812,856

[22] Filed: Jul. 5, 1977

[30] Foreign Application Priority Data

Jul. 7, 1976 [AT] Austria ................................. 4977/76
May 18, 1977 [AT] Austria ................................. 3581/77

[51] Int. Cl.² .......................... C05F 11/08; C05F 5/00; C05F 11/00
[52] U.S. Cl. ............................................ 71/9; 71/26; 71/23; 71/8
[58] Field of Search ....................... 71/8, 9, 10, 11, 23, 71/25, 26; 47/1.4, 19; 126/263; 23/259.1; 426/384, 385

[56] References Cited

U.S. PATENT DOCUMENTS

| | | | |
|---|---|---|---|
| 1,029,378 | 6/1912 | Lawton | 71/9 |
| 1,456,332 | 5/1923 | Nash | 71/9 |
| 3,285,732 | 11/1966 | Schulze | 71/9 |
| 4,003,160 | 1/1977 | Müller | 47/1.4 |

FOREIGN PATENT DOCUMENTS 638917  6/1928  France ........................................ 71/23

OTHER PUBLICATIONS

Kirk-Othmer Encyclopedia of Chemical Technology, vol. 22, 1970, pp. 318-319.
*The Technology of Wine Making*, Berg et al., Avi Publishing Co., Conn., 1972 pp. 251-253.
*Uses of Waste Materials*, Bruttini, Arturo, P. S. King and Son, Ltd., 1923, London, p. 236.
*The Technology of Wine Making*, Amerine, Berg and Cruess, Conn., The Avi Publishing Co., Inc., 1967, pp. 657, 661.

*Primary Examiner*—R. E. Serwin
*Assistant Examiner*—Chris P. Konkol
*Attorney, Agent, or Firm*—Toren, McGeady and Stanger

[57] ABSTRACT

A process for the preparation of a high grade fertilizer from pressing residues obtained from wine and fruit juice production is disclosed wherein the residues are first stored under anaerobic conditions and are then loosely mixed with air to produce a mass which then undergoes intense aerobic degradation to produce heat, carbon dioxide, moisture and a finely divided high quality fertilizer. Apparatuses for carrying out this process are also disclosed.

11 Claims, 19 Drawing Figures

METHOD AND APPARATUS FOR PREPARING HIGH GRADE FERTILIZER

BACKGROUND OF THE INVENTION

1. Field of the Invention

This invention relates to a field of composting of organic matter to produce fertilizers. More specifically, this invention pertains to a method and apparatus for converting the residue from grape and fruit juice producing processes into a high grade fertilizer and for recovering the heat and carbon dioxide produced from the decay of such residues.

2. Description of the Prior Art

The search for high grade humus or fertilizers is a continuing one. A number of natural fertilizers are known as well as, of course, chemically synthesized fertilizers. All of these are, however, either in short supply due to difficulties in obtaining starting materials or because of the relatively low supply of materials to ferment into natural fertilizers. In searching for new starting materials for obtaining humus, marc or pressing residues from wine making were considered. Generally, in the wine making art, the marc which accumulates in relatively large quantities is considered an unsuitable comodity and is generally moved and disposed of. One of the reasons is that during the degradation phase of such marc residues, these materials are highly incompatible with plant root systems because of the aggressiveness of the participating microbes within the decaying marc and the metabolic products which are produced therefrom. As a result, it has not previously been considered to utilize marc and other pressing residues from fruit juice production as fertilizers. Also, and particularly with respect to the wine growing industry, extensive sums are spent for disposing of marc accumulations which, heretofore, have served no useful purpose.

The demand for organic fertilizers is quite high and since such fertilizers possess much more desirable ecological behavior than the chemically or synthetically produced fertilizers, the ability to produce high grade natural or organic fertilizers would be of great economic importance. With respect to marc, it should be noted that the world production of grapes is larger than the negotiable world harvest of bananas, oranges, and apples, taken together. Eighty-five percent of these grapes are processed into wine, sparkling wine, and unfermented grape juice. About twenty percent of the weight of these grapes remains behind as the marc.

SUMMARY OF THE INVENTION

Applicant has discovered a method for economically subjecting marc accumulations as well as accumulations of other pressing residues from fruit juice processing to decay so as to produce an extremely high grade fertilizer. Furthermore, applicant has discovered that certain other by-products, namely, heat and carbon dioxide, which are produced from the decay of the marc can be utilized for heating buildings, hot houses, and controlling the atmosphere of such hot houses.

In particular, the process of the present invention resides in subjecting marc which has been temporarily stored under anaerobic conditions to aerobic decay by loosely mixing the residues with air. Intense aerobic degradation takes place which produces a relatively high level of heat for a continuous amount of time as well as usable quantities of carbon dioxide. The final product obtained is a finely divided high quality fertilizer.

In another aspect of the invention, the carbon dioxide and heat which is generated from the aerobic decay of the pressings, is utilized to heat buildings, rooms, hot houses, and also to control the carbon dioxide content of enclosures utilized for growing vegetables and fruits as well as other types of plants.

In yet another aspect of the present invention, an apparatus is described for carrying out the aerobic decay of the residues which is composed of a chamber for confining the residues in a loose mass, the walls of the chamber being composed of a metal mesh, the solid portions of which have a cross-section which slopes downwardly towards the interior of the chamber so that the moisture which is produced from the aerobic decay condenses on the sides of the mesh and is directed back to the mass of decaying material.

DESCRIPTION OF THE PREFERRED EMBODIMENTS

Because of their high sugar content, grapes belong to that class of fruits which are highest in calories. Grape pressing residues which contain somewhat more than 50 percent moisture have a sufficient amount of easily degradable carbohydrates in solution to supply the microorganisms with many points of attack for rapid degradation. Thus, in three to four days, temperatures of more than 50° C. are reached during aerobic decay. If there is an adequate supply of moisture and oxygen, skins and stalks can be converted after only a few weeks at the high decaying temperatures to a fine, friable humus.

The fresh marc contains approximately 1 percent nitrogen and all the nutrients and trace elements which are required for the growth of living cells and are therefore a favorable nutrient medium for microorganisms. Only the grape seeds can withstand the action of the microorganisms insofar as they are able to maintain their external form and decompose only slowly after two or four years in the compost heap or in soil.

The high decaying temperatures (temperatures of up to 73° C. were noted in experiments) are of interest because they are available for use after the grape harvest, that is, in the cold periods of the year. A small amount of 100 to 500 kg of residue cools off after three to six weeks. A large deposit of marc, such as that which accumulates at wine growers' cooperatives or large-scale wineries can give off heat for six months and more. The large amounts of marc retain their high degree of heat for such a long time because in their interior, which is shielded from the air by the outer layers, anaerobic conditions exist which permit only a highly retarded degradation.

Small amounts of marc can also be kept, by dense packing and by covering with sheets, from prematurely decaying vigorously under aerobic conditions and, if they are then exposed to aerobic conditions at the right time, can be used for rapid microbial degradation with vigorous evolution of heat.

Apart from the heat which can be used for keeping lounges, common rooms, recreation rooms and hothouses at moderate temperatures as well as for heating water, the carbon dioxide that is liberated during the degradation of organic matter is of particular importance for the growth of plants in hothouses, as is evident from the Austrian Pat. Nos. 97,677, 102,750 and 102,757.

It is noted that if an additional 1.2 g of $CO_2$ per cubic meter is added to the air of the hothouse, whereby the percentage of carbon dioxide in the air is increased from 0.03% to about 0.1% and this increased concentration is maintained by constant additions of $CO_2$, a possible three-fold increase in plant growth can be expected since normally, the natural carbon dioxide content of the air is the limiting factor for the assimilation.

In the complete combustion of 1.0 g of grape sugar (glucose), 1.07 g of oxygen are taken up and 0.6 g of water as well as 1.47 g of carbon dioxide are given off. In the microbial degradation of other organic substances under aerobic conditions, carbon dioxide is the product that is always present in the greatest proportion by weight.

If the organic substance is to be used for obtaining carbon dioxide for greenhouse cultivation, care must be taken that marc material which contains large amounts of alcohol and in which oxidation of the alcohol can take place to water and to the rather volatile acetic acid, is not used since the latter is harmful to plants. This danger is avoided if the fresh residues from pressing are taken not from the surface but from the interior of the deposited heap where the alcohol has largely been degraded. Various organic acids are formed under the predominantly anaerobic conditions. The material is characterized by a brown color and by a pH of 4, temperatures mostly between 55° and 60° C., and an odor that is characteristic of baked yeast loaves containing dried fruits.

This acidic material need not be moistened. If it is in a loosened state and comes together even with the smallest amounts of aerobically decayed, blackish marc, a vigorous decay soon sets in. Since the prime aim is to produce a high grade organic fertilizer, these procedures are more profitable than those with energy carriers whose combustion does not yield improved products but products that are harmful or difficult to utilize.

The process described with respect to grape marc can also be utilized with pressing residues from fruit juice production.

Accordingly, the invention relates to a process and to installations for preparing high grade fertilizer from organic substances and is characterized by the fact that fresh pressing residues from wine and fruit juice production, especially grape marc, which have been stored temporarily under anaerobic conditions are than arranged in loose fashion and supplied with air from the outside.

It is advisable to occasionally loosen the already partially decayed pressing residues and, at weekly intervals or at intervals of several weeks, to mix in fresh pressing residues or pressing residues which have been stored temporarily under anaerobic conditions in order to enhance the microbial decay. In so doing, it is advantageous to moisten the pressing residues which have become dry.

The pits or seeds of the pressing residues which resist rapid decay can be utilized separately in that they are separated from the largely or completely decayed portions of the pressing residues and subjected to a comminuting process and an after-decaying process. In order to facilitate the separation of the pits and seeds, the pressing residues are previously subjected to a drying process.

The high temperatures that result during microbial degradation can be utilized for recovering heat by withdrawing heat from the pressing residues during their decay and using it especially for heating hothouses or for heating water. It is particularly advantageous to collect the $CO_2$ that is formed during the decaying process and to supply it to a hothouse or the like.

The equipment for carrying out the process may have various designs which can be modified to suit specific end purposes where the heat or carbon dioxide are required. The decay may take place in heaps, chambers or receptacles. Such receptacles can be set up within hothouses. Chambers or heaps can be set up in the vicinity of those buildings to which the heat, obtained from the decay, is to be supplied. The invention furthermore relates to details of the recovery and the utilization of the heat of decay and of the $CO_2$ that is formed thereby.

Figure 1:
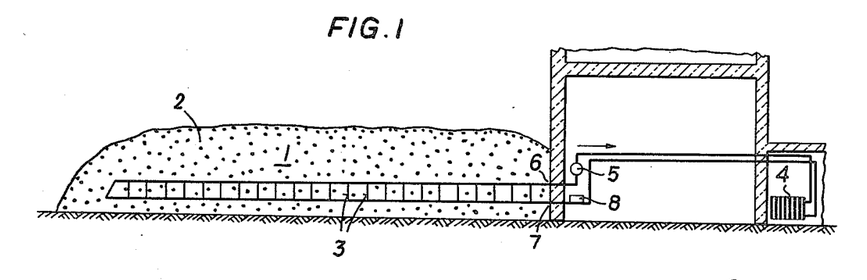
FIG. 1 is a schematic view of an installation for determining the amount of recoverable heat from aerobic decay of fruit pressings.

Referring to the drawings, FIG. 1 shows an experimental installation, represented in section, comprising a tubular loop 1 which extends into the interior of a mass of marc stored in the form of a heap 2. Water flows through this tubular loop, flowing in through the lower pipe and out through the upper pipe. To increase the heat transfer, the two pipes of the loop are connected to one another by metal rods 3 which are welded on. The tubular loop is connected with a heater 4, a circulating pump 5 being connected in series. The inlet temperature of the water was measured at site 6 and the outlet temperature at site 7. A water clock 8 is arranged in the circuit in order to determine the amount of water that has flowed through the loop. This experimental installation was in operation, night and day without interruption, from November 2 of one year to April 6 of the following year. Shortly after, the heater could be switched off because of rising outside temperatures, the maximum temperature of the marc material within the heap 2 was still about 64° C.

At maximum pump output, the installation supplied $4.6 \times 10^6$ joules per hour for a short period. The daily verage was $4.0 \times 10^6$ joules per hour. The heat delivered over the whole of the operational period was in the range of $12.5 \times 10^9$ joules. The tubular loop had a length of 17.60 m.

This device could, of course, only withdraw a moderate portion of the total heat production from the heap. An optimum design of the heat exchanger would have given about three times the yield of heat. In a later experiment, the air access was improved, whereby the amount of heat obtained over the same period of time was increased to about $21.0 \times 10^9$ joules.

Marc, which is decayed under aerobic conditions, is dark brown. No stalk or skin or peel residue can be recognized and it contains only the pits or seeds which have been decomposed slightly on the outside. This material is neutral to weakly basic and initially forms at the surface. Under the anaerobic conditions in the interior of large deposits of marc, acidification occurs which retards the degradation processes. For this reason, pressing residues in the interior of large deposits retain their combustion values for a long time. During the winter, they can be taken at any time from the interior of the heap. As the marc is loosened and mixed to allow access of air, the microbial activity quickly flares up. After an initial cooling, temperatures of 60° to 70° C. are obtained within 48 hours.

This "combustion material" can be preserved for any use in the center of a compactly stored heap for six months and longer.

Even with maximum utilization of the biogenic heat for heating purposes and for hothouse cultivation during the cold period of the year, the greatest value of the present process still consists in producing organic fertilizer since, apart from the water that escapes easily, marc has no components of high weight and slight commercial value. The nitrogen and potassium content is significantly above that of stable manure and many types of compost. The form of the decay, i.e., aerobic decay, which leads most rapidly to a well finished material with a maximum of key nutrients, is, at the same time, that which liberates the most heat. The following advantages are thus associated with the invention.

As a result of the inventive process, the residues of pressings, even those from wine growers' cooperatives are no longer an undesirable waste material but constitute a valuable raw material.

The heat, resulting from the microbial degradation of marc, is available especially at the beginning of the cold time of the year and the production of calories from approximately 100 tons of marc should not decline before the end of April.

The end product of microbial combustion is not undesirable ash but rather, is a high grade organic fertilizer which is more valuable than the undecayed starting material which in incompatible with roots. All expenditures for the appropriate storage of a heating heap are amortized therefore by the recovery of the organic fertilizer.

Furthermore, the present invention provides a material for which there are no transportation costs and no waste disposal problems and which supplies a relatively modest amount of energy in a constant and uniform manner over a period of months, without the use of workers or of external energy if thermal convection is utilized.

Microbial combustion does not create any waste gas problems. Appreciable amounts of 3,4-benzpyrene, sulfur dioxide and carbon monoxide are not detectable from the decay process. Water vapor and carbon dioxide escape in large amounts and can be used in greenhouse cultivation, together with the heat of decay.

In a preliminary experiment with 45 tons of marc, the heated air, enriched with $CO_2$ and $H_2O$ was successfully introduced during winter from the interior of the marc material into a temporary greenhouse.

Even if the heat within the residues of pressing subsides in the spring, the humified material still contains appreciable amounts of energy which are given off unobtrusively. If the material is then added to soils used for agricultural purposes, the decomposition continues to proceed slowly as a result of the action of soil organisms. The substances and the energy obtained by further degradation aid the life activities and the growth of living oragnisms in the soil and this has a considerable influence on the chemical-physical properties of the subsoil. If they are plentifully abundant, the consequences are very welcome and nutrients and soil moisture are held more effectively. Complicated physiological mechanisms appear to endow the cultivated plants growing there with a higher resistance to noxious animals, destructive insects and parasites. Finally, the reducers in the soil constantly supply carbon dioxide that originates from the organic fertilizer which is of benefit to the assimilation activities of the plants.

It may be assumed that the use of grape marc will also soon be followed by the use of other organic material. From this, a decentralized energy recovery system may develop having unquestionable ecological compatibility. The actual energy yield may be very slight, but the overall usefulness on a practical basis is high. Thus, the present contribution to the technology of biogenic energy recovery, in turn, contributes to once again closing the material cycles which, until now, have frequently been interrupted.

Figure 2:
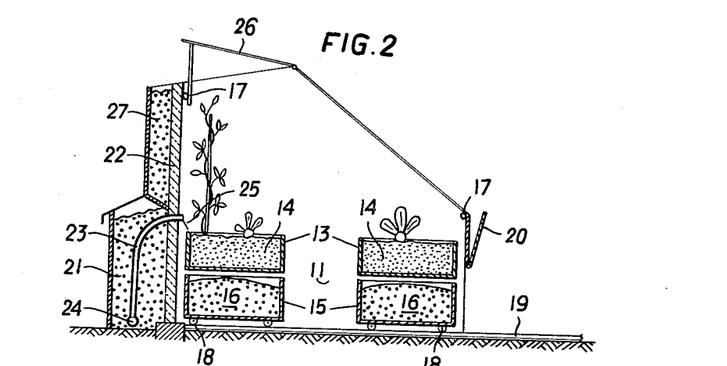
FIG. 2 is a diagram in cross-section of a greenhouse.
Figure 3:
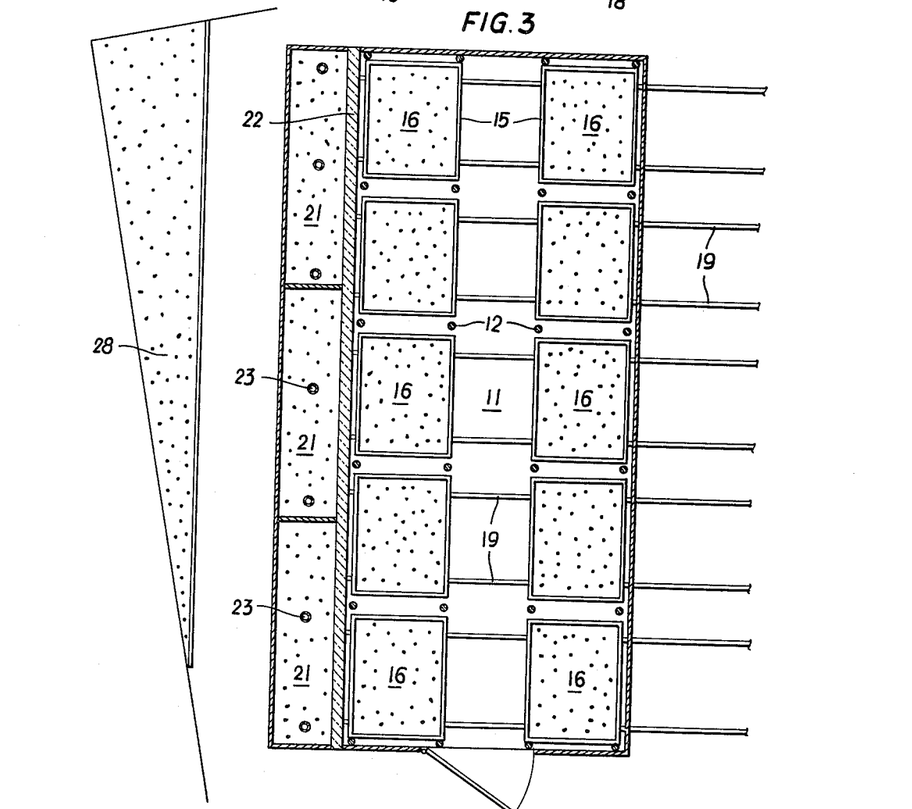
FIG. 3 is a cross-section diagram of the greenhouse of FIG. 2 taken from the top.

A hothouse according to FIGS. 2 and 3 was used for carrying out the experiment.

This greenhouse, 6 m long and 2.5 L m wide, has a floor area of 15 m² and a capacity of 28 cubic meters. Two iron racks 12, standing to the right and to the left of the center passage 11, support six boxes of soil 13 with a total of 9.45 m² of plantable surface at a favorable working height of 90 cm. The 34 cm deep layer of soil 14 in the boxes was sufficient for all experimentally planted types of plants. Below the boxes with plants were ten wooden boxes 15 which, with their exterior dimensions of 105×90 cm floor area and 48 cm height, could hold about 200 kg of pressing residues 16.

At the height of the decaying processes, the contents of the box reached temperatures of 68° C. and sometimes even 72° C. The moisture saturated warm air rose upwards from the boxes or marc past the soil boxes. During very cold nights, moisture deposited on the interior side of the glass panes in the form of ice crystals and at other times as water drops. The condensed water ran off downwardly where it was caught by a gutter 17 and supplied to the boxes of soil. The carbon dioxide which accumulates at the same time as the water vapor is adequately distributed by the air flow and has not led to any questionable concentrations in the lower part of the hothouse.

Boxes of marc run on four ballbearings 18 and rails 19 and can, at any time, be pulled into the middle passage or, if flaps 20 are opened, to the outside in order to exchange the contents completely or to mix them with undecayed marc. Even when the material appears to have been rather inactive, it could again be made hot or active by being loosened and in those instances when it dried out excessively, by being moistened somewhat with water.

The greater part of the heat energy is liberated in the hothouse by the microbial degradation in the ten boxes of marc. However, a considerable amount originated from the three decaying chambers 21 which are immediately behind the back wall of the hothouse. The hot marc gave up its heat directly via the brick wall 22 to the interior of the greenhouse. Gas exchange took place in these chambers, partially via the outer wooden walls and partially via the plastic drainage pipes 23, which obtained fresh air from a concrete pipe 24 lying at floor level. These can optionally release additional warm air into the interior of the greenhouse when the lids 25 were taken off the openings.

When fresh material is poured into the decay boxes, it may cool off a little depending on circumstances, until the aerobic decay that sets in rapidly brings the temperatures in the course of 2 to 4 days up again to the highest point. The heat subsequently subsides gradually until, within 3 to 4 weeks, the temperature of the contents of the box is approximately that of the environment. The degradation subsequently continues only slowly and is carried out more by insects and their larvae than by bacteria and fungi.

When combustible material is burned, the oxidation process can be regulated by the supply of air. Basically, this also happens with the decay boxes. A plastic cover inhibits the process and aeration by means of perforated pipes accelerates it.

These regulating processes never have as rapid an effect as they do in the case of furnaces. In addition, it should be taken into consideration that the composting of pressing residues is an upgrading process in which fertilizer recovery and not heat recovery is the focal point.

In the cold days and nights of January, there were many marc boxes in the greenhouse in which there was vigorous decay. When the cold period of the year commenced, it was not yet necessary to fill all the boxes; towards the end of the winter half of the year, it was no longer necessary to renew the already decayed contents of the boxes. During the day, when the sun was shining, it was sometimes so warm that the two ventilating windows 26 had to be opened. However, the true test of the system was on those nights when there was frost.

The minimum temperatures inside and outside of the greenhouse were determined in 43 measurements. The average minimum outside was about $-1.8°$ C. and inside the greenhouse $6.5°$ C. The difference, accordingly, was $8.3°$ C. Temperatures below freezing were never measured inside the greenhouse. The differences between the two minima were particularly large on some days:

| Outside Minimum | Glasshouse Minimum | Difference |
| --- | --- | --- |
| $-6.0°$ C. | $+7.0°$ C. | $13.0°$ C. |
| $-8.5°$ C. | $+7.0°$ C. | $15.5°$ C. |
| $-8.1°$ C. | $+6.0°$ C. | $14.1°$ C. |
| $-7.7°$ C. | $+4.5°$ C. | $12.2°$ C. |
| $-12.3°$ C. | $+6.0°$ C. | $18.3°$ C. |

To prevent heat loss from the upper part of the brick wall 22, particularly at night, a flat abutting receptacle 27 was prepared and filled with decayed marc. Although this could not give off any heat, it did form an effective insulating layer. In addition, it forms a particularly favorable environment for humus dwelling earthworms which multiplied rapidly and improved the quality of the humus even further.

Behind the greenhouse, there is a wood partition 28 which was set against the high walls of the piece of land and was intended for the finished pressing residues, as soon as they had given off their heat in the marc boxes within the hothouse.

The limiting ecological factor that restricts plant production most rigorously in winter is the low outside temperature. Even with only frost that clearly leaves behind visible evidence of damage in the case of heat-loving plants, such as, tomatoes, temperatures below $+10°$ C. bring protoplasmic flows in the cells to a standstill, thus showing that these plants can no longer maintain their physiological functions. In addition, the intensity of the photosynthetically useful radiation is reduced in winter and furthermore shortened in the 24 hour day. This has a retarding effect on growth, but in the case of many cultivated plants, it is not nearly as restricting a factor as the reduced outside temperature.

In a closed greenhouse the temperature, especially during the day, is higher than the temperature outside, even without heating. The air, however, contains only 0.03% carbon dioxide and the $CO_2$ content in a closed hothouse would quickly be used up by the plants. The method of raising the greenhouse temperatures by decaying marc has the additional advantage that the "carbon dioxide fertilization" of the plants is well taken care of by the $CO_2$ evolution from the marc. With the present process therefore, it is unnecessary, in periods of cold weather, to ensure adequate supplies of $CO_2$ for the cultivated plants by opening the windows whereby an appreciable portion of the heat would escape.

In the period from October 15 to the end of the cold time on April 30, tomatoes, several varieties of radishes, carrots, lamb's lettuce, Boston lettuce, spinach, garden cress and parsley were grown in the greenhouse.

The energy for keeping the hothouse at a moderate temperature was obtained from a total amount of 8000 kg of marc. The use of the pressing residues as a heat emitting material is thus very worthwhile, considering that the fertilizer obtained after the decay is of a very high quality.

Three experimental boxes were filled with the same amount of normal soil. Composted marc was mixed, in accordance with the invention, with the soil of a first box to the extent of 2.5% of the dry weight of the soil. The same quantity of marc, but in ashed form, was mixed in with the soil of the second box. Nothing was mixed in with the soil of the third box. Garden cress was seeded uniformly in the three boxes and harvested after five weeks. The amount obtained was:

190 g normal soil,
600 g soil plus marc in ashed form,
1,740 g soil plus marc compost.

Accordingly, the yields were in the approximate ratio of 1:3:9.

A plant, operating from an economic point of view, should be in the vicinity of a large wine growing operation and consist of humus manufacture coupled with a market garden. The greenhouses should be in an open area sloping towards the south so that the cultivated plants receive the maximum amount of light during winter. Such an operation can produce vegetables and other products throughout the whole year. A slight percentage of the fertilizer produced can be used internally. The larger portion will, however, be sold. In the winter half of the year, the decay of the marc is aimed at recovering heat, $CO_2$ and water. In summer, the material can be dried and separated into fine material and pits or seeds. The latter should be broken up by machine and subjected to a brief additional decaying action after which they may be sold, together with the fine material separated by sieving, as a high grade organic fertilizer.

Figure 4:
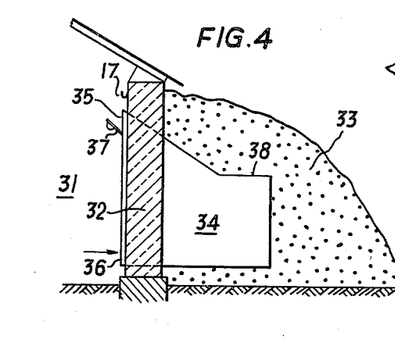
FIG. 4 is a section view of an apparatus in accordance with the present invention used for heating a greenhouse.
Figure 5:
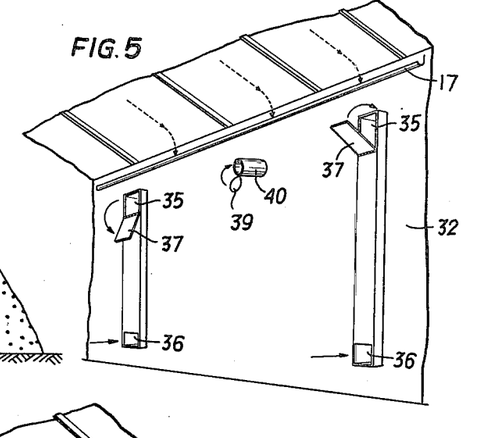
FIG. 5 is a perspective view of an apparatus utilized for a greenhouse.

It is also possible to decay the pressing residues on the outside of the greenhouse if care is taken that there is heat exchange with the greenhouse and that the $CO_2$ which is formed is supplied to the greenhouse. FIGS. 4 and 5 show a tested development. A greenhouse 31 is separated by a brickwall 32 from a heaped amount of marc 33. Into this heaped marc and through the brick wall 32 extend pocket like chambers 34 which are connected at their top and bottom and through openings 35 and 36 with the interior of the greenhouse.

In order to regulate the heating, openings 35 and/or 36 are such that they can be closed completely or partially by flaps 37. The upper part of the chamber is provided with a flat section 38, on which wooden boards can be placed which can serve as the base for the treatment of pressing residues 33. Between the chambers 34, perforated pipes or hoses are moved into the interior of the pressing residue. At their upper end, they feed through the wall 32 and have an outlet 40 equipped with a flap 39, into the interior of the greenhouse 31. $CO_2$-containing warm air emerges from these perforated pipes.

Figure 6:
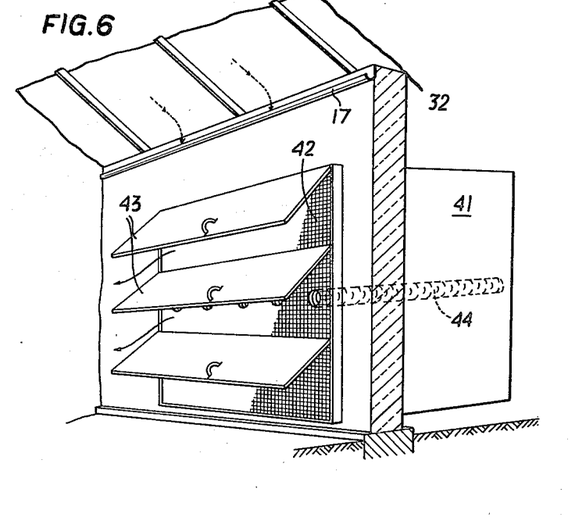
FIG. 6 is yet another perspective view of a different modification of the apparatus of FIG. 5.

A particularly effective carbon dioxde gasification of the greenhouse is possible by after-decaying the comminuted pits and seeds of pressing residues. This is especially important when the radiation from the sun is high and additional heat is not necessary, but additional carbon dioxide is. As shown in FIG. 6, the outer wall 32 of the greenhouse, for this purpose, is provided with a box 41 having openings so that the ground grape seeds can be supplied. The rear wall of this box is preferably so fashioned that it can be taken off in order to facilitate emptying the box. The side of the box facing the greenhouse is closed off by a lattice 42 that can be covered with a flap 43. Several perforated pipes or hoses 44 discharge through the lattice. They are preferentially inclined slightly downwards towards their outlet 8, in order to facilitate the escape of the substantially heavier $CO_2$ into the interior of the greenhouse. Although temperatures greater than 60° C. occur also here during the decaying process, this equipment is used primarily for obtaining the $CO_2$ that is required in the greenhouse during the warmer part of the year. It is therefore advantageous to keep and conserve the pit and seed material which has been segregated from the already decayed components of the pressing residues, until it is used. This can be accomplished by storing the first dried and ground pits and seeds in air-tight plastic bags. The pits and seeds brought into the chamber 41 are activated initially by being moistened.

Figure 7:
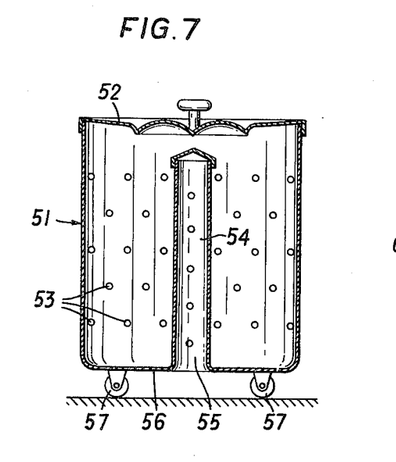
FIG. 7 is a section of an apparatus for holding the pressing residues.

FIG. 7 shows a receptacle of a kind that is particularly suitable for setting up in greenhouses. The receptacle 51 has a lid 52. Its wall and its base have openings 53 for gas exchange. In the middle, there is a perforated pipe 54, which is closed at the top and connected with the atmosphere by means of an opening 55 in the base 56 of the receptacle 51. The receptacle 51 stands on a stationary or mobile frame, of which only the rollers 57 are shown. If such a receptacle that can hold about 80 to 100 kg of marc is set up in a hothouse, it not only releases $CO_2$ but also heats the greenhouse. Because $CO_2$ is given off, it is no longer necessary to ventilate the greenhouse, ventilation in winter being associated with loss of heat.

Figure 8:
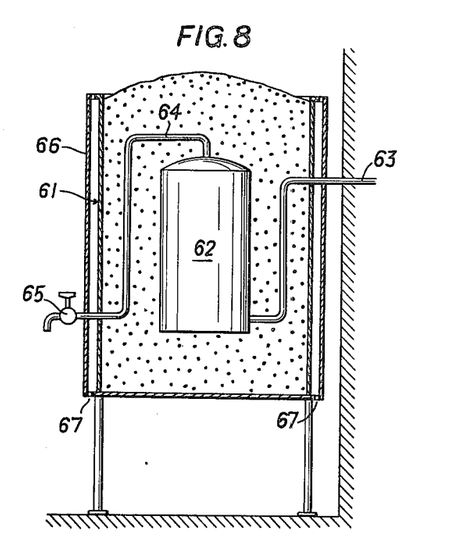
FIG. 8 is a schematic section of a device for heating water.

FIG. 8 shows an arrangement for preparing warm water. A pressure vessel 62 that is connected to the water main 63, is arranged in a receptacle 61. For drawing off water, a pipe 64 leads from vessel 62 to a water tap 65.

The receptacle 61 is preferably equipped with a lateral door so that the pressing residues that surround the pressure vessel can more easily be emptied out. The receptacle 61 is at a distance from the receptacle wall 66, so that aeration can be effected with the least possible loss of heat. Air circulation in the double jacket can be adjusted by arranging a few small openings 67. No lid need be provided. In an experimental installation, the pressure vessel had a capacity of 25 l and the receptacle 61 could hold about 200 kg of marc. Heat evolution occurred for two to three weeks with a maximum temperature of 68° C.

Figure 9:
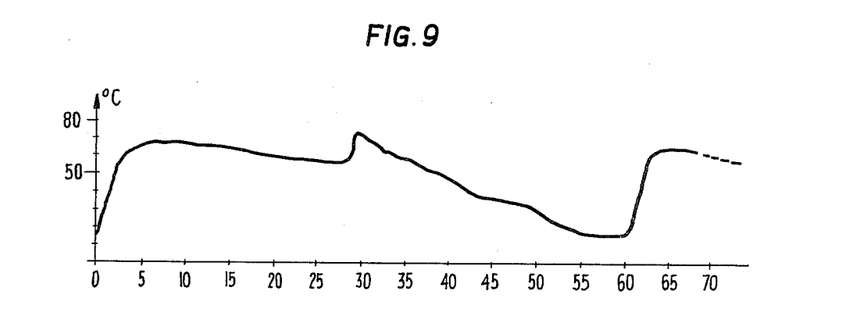
FIG. 9 is a graph of the temperature variation during the aerobic decay of grape pressings.

A receptacle, with a capacity of about 1 m³ was filled with about 450 kg of marc. The temperature in the center of the cube was measured. The temperature variation is shown in FIG. 9. The temperature rose within a few days to 68° C. and fell again to about 56° C. in the course of 28 days. After thoroughly mixing the contents of the cube, the temperature rose within a day to 73° C. and fell in the course of a further 28 days to approximately the temperature of the surroundings.

In these two phases of the decay, primarily the grape skins and stalks were degraded to humus. The seeds which were mostly attacked only superficially, were sieved out, dried, ground up and once again mixed in. The temperature once again rose and reached about 64° C. After the 60th day, the heat energy, water vapor and carbon dioxide production originated mainly from the decay of the comminuted seed material. The experiment was stopped after 68 days.

Figure 10:
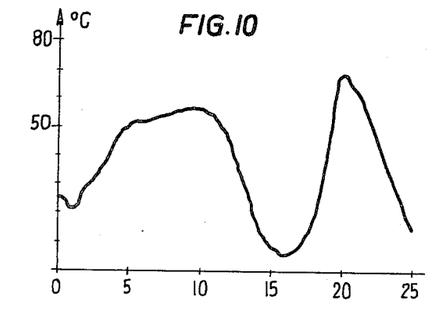
FIG. 10 is a graph similar to that of FIG. 9.

FIG. 10 shows the temperature variation in a receptacle that was filled initially with 75 kg of marc. The initial temperature rise was not as rapid which is attributed to the small amount of marc. After 10 days, the temperature reached a maximum of 57.5° C. and then decreased within 16 days to the temperature of the environment. On the 17th day, the receptacle was emptied and the marc was mixed and refilled into the receptacle. Within four days, the temperature rose to 69° C. After the 25th day, the experiment was discontinued. During the decaying process, between 15 and 25% of the dry weight was converted to gas so that during the more vigorous activity, at least 300 g $CO_2$ were obtained daily from the 75 kg of material.

Figure 11:
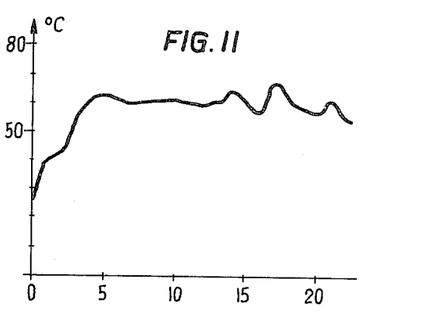
FIG. 11 is a graph similar to that of FIG. 9.

The temperature variation in Box 15 of FIG. 2 was also measured. The result is shown in FIG. 11. Each wooden box had a capacity of 0.4 m³ and could be filled with 200 kg of freshly accumulated pressing residues. The temperature rose up to the 5th day to 64.6° C.

By loosely filling in the residues of pressing initially and later loosening them up even more, the temperature could constantly be maintained at a value greater than 60° C. On the 16th day, 10 l of water were added, whereupon the temperature rose to 68° C. only to sink again to 56° C. by the 20th day of the experiment. After once again mixing in 10 l of water, the temperature rose somewhat. It was apparent that the temperature could be kept at an appreciably high value for about three weeks by a simple and rapid procedure.

About 60 to 80 kg of the loosely packed pressing residues are required in order to be sure of being able to build up high temperatures even at times of cool winter temperatures. In the case of ground grape seeds, a few kilograms are sufficient for beginning the decay process through which appreciable temperatures arise.

The details and advantages of the inventive process and the equipment and installations required for carrying out this process were described in the preceding only in connection with grape marc because scientifically exact experimental installations are available only for this material. Practical experiments with other pressing residues, such as those obtained in the production of fruit juices and the like, have shown that basically the same applies for them as for grape marc.

Devices for utilizing the heat of composting for workshops, lounges, toilets and other rooms, which need only be kept at a moderate temperature, may have many designs and can be adapted to local conditions. The decaying marc material should lie gainst a thin brick stone or concrete wall and give off a part of its heat by direct contact. It is usually warmest in the center of the decaying mass. If a room is to be heated, a closed tubular loop should be provided in which heated water rises in a pipe arranged vertically in the center of the decaying mass and falls in a vertically lying section of the pipe, giving up its heat to the room to be heated. By these means, the water is kept in constant circulation. A filling and expansion receptacle must be provided at the highest place.

Alternatively, a sheet of metal is placed at the wall that is to be heated. The remaining sides should consist of marc layers which, after having decayed, hardly give off any heat. Instead, however, they represent an effective insulating layer against losses to the outside. Since it is separated only by a lathe grid, metal rods or a lattice from the actual composting chambers, the marc layer constantly has contact with and innoculates the freshly filled-in material with microbes. A chamber should be able to take up about 100 kg and need then be charged again only after two to three weeks. The device can, like conventional furnaces, be equipped with charging doors or flaps which lie one above the other and are separated by a section of the wall. The decayed material is removed through the lower charging door and fresh material is introduced through the upper door. It is advantageous if the work can be carried out from the outside, as is the case in many tiled stoves. The chambers, including the insulating layer, may be covered on the outside, for example, with wood.

The foregoing describes an apparatus for utilizing the process of the present invention for relatively large amounts of marc. However, for smaller amounts of material to be decayed, we have found it preferable to use an apparatus as described hereinafter.

Heat is formed in aerobic decay and decreases the moisture content by evaporation. Since, however, a certain moisture content is required for the decaying process, it is appropriate to find an arrangement in which the resulting water vapor is condensed and once again conducted in liquid form to the material that is to be decayed. This object is achieved inventively by providing walls of metal mesh for keeping the pressing residues in a loose state while they are decaying, the solid portions of the mesh having a cross-section that is inclined from the outside top part to the inside bottom part, whereby the side of the metal mesh that comes into contact with the pressing residues, forms the inner side of the walls. The walls, formed by the metal mesh, can be reinforced on the outside by a grid and overall, the equipment preferably has the shape of a receptacle. A different form of the equipment consists of the fencing of beds with metal-mesh walls, whereby several of such fenced in beds are arranged parallel to one another in a spaced apart relationship and the space between the beds is filled with material that is to be decayed.

Figures 12, 13:
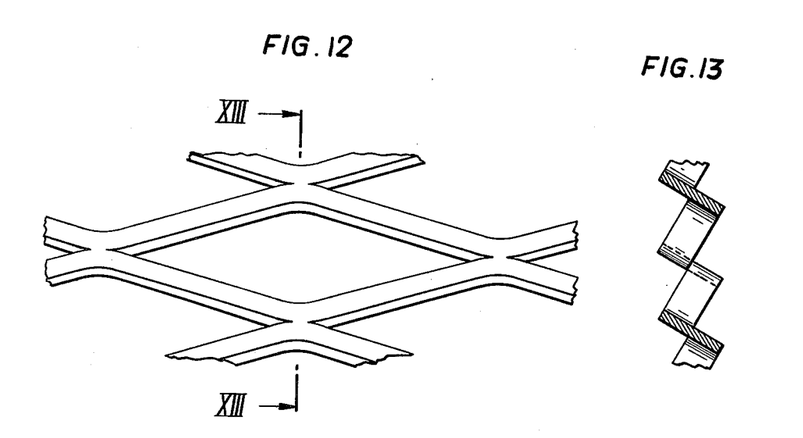
FIG. 12 is a section of a metal mesh in elevation.
FIG. 13 is a section along the line XIII—XIII of FIG. 12.

The object of the invention is represented in several versions by way of examples in the drawing. FIG. 12 shows a section of a metal mesh in elevation. FIG. 13 shows a section along the line II—II in FIG. 12, FIG. 14 an inventive receptacle in diagrammatic representation, FIG. 15 a section through this receptacle, FIG. 16 a similar section in a larger scale, FIG. 17 a detail, FIG. 18 an inventive receptacle in the form of a bucket and FIG. 19 an installation for a lettuce bed.

A conventional metal mesh is shown in FIG. 12. For the inventive purpose, it is to be arranged so that the longitudinal diagonal runs horizontally. Furthermore, care is to be taken that the cross-section of the wires runs as is shown in FIG. 13, from the outside upper part to the inside lower part, so that the water vapor which is formed by the decaying process, deposits on the metal mesh and the droplets run back inwardly into the decaying material where they are absorbed.

Figure 14:
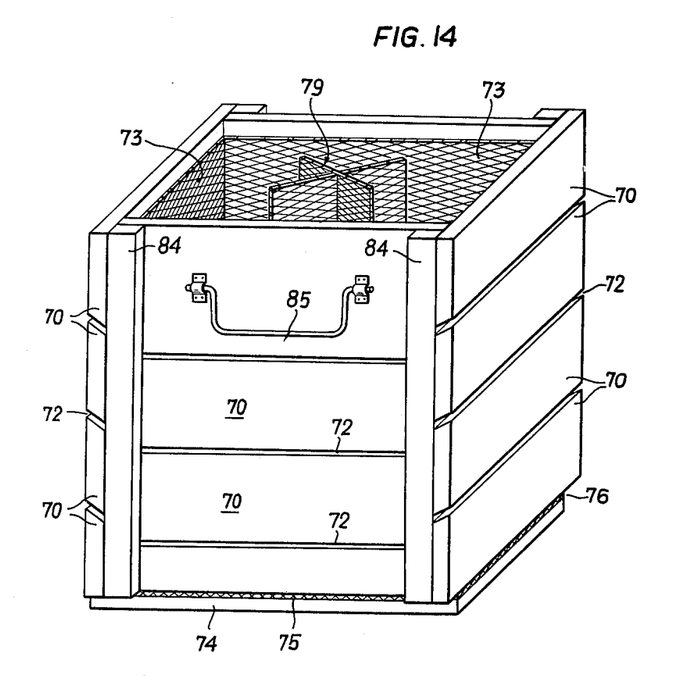
FIG. 14 is a diagrammatic representation of an apparatus in accordance with the present invention.
Figure 15:
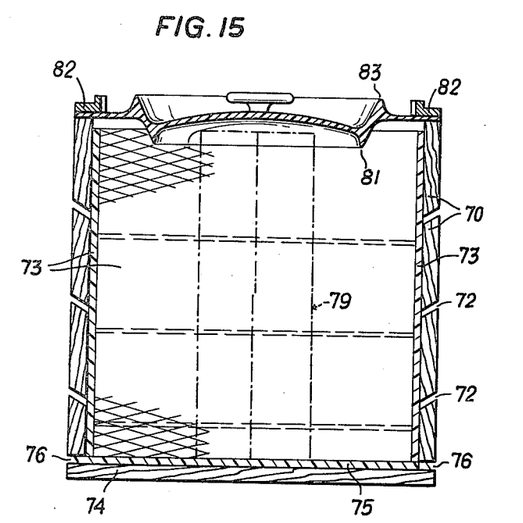
FIG. 15 is a section through the apparatus of FIG. 14.

According to FIG. 14, the decaying process takes place in a box-like receptacle that is fashioned of wooden boards 70 arranged at a distance 72 from one another in order to permit the access of air into the interior of the receptacle. The wooden grid so formed is provided on the inside with metal mesh 73 as is shown in FIG. 15.

The cross-section of the interstices 72 is also formed so as to incline from the outside upper part to the inside lower part so that the finely particulate decaying material cannot trickle through the wire mesh and become lost. The base 74 which is also made of wood is lined similarly with metal mesh 75 which extends to edge 76 of the base in order to allow air to also penetrate between the lowest boards 70 and the base 74.

Figure 16:
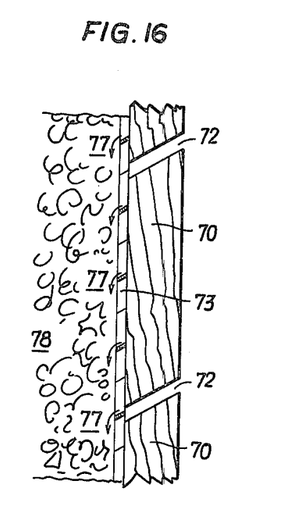
FIG. 16 is a section similar to that of FIG. 15 in larger scale.

The arrangement is shown on a larger scale in FIG. 16. The condensed water that is formed at the wire mesh 73, is conducted to the decaying material 78 as shown by the arrows 77.

Figure 17:
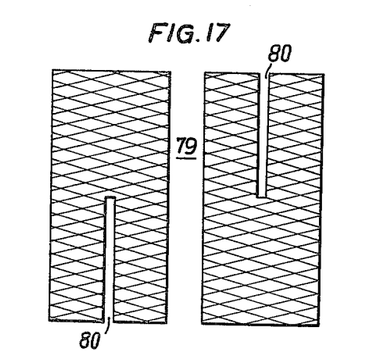
FIG. 17 is a section in detail of FIG. 14.

An aeration device is provided in the interior of the receptacle and is indicated collectively as 79. It consists of two strips of metal mesh which, as shown in FIG. 17, are provided with longitudinal slits and can be assembled together in the form of a cross. The device runs from top to bottom and the wings should be arranged diagonally. The receptacle is filled with pressing residues and covered with a lid that can be seen in section in FIG. 15. It consists preferably of a plastic material and is provided with a drip ring 81 which is directed towards the inside. By these means, the water that condenses on the lid is returned to the decaying material and, moreover, in a region that is at a distance from the walls of the receptacle. Although the lid does not form an airtight seal with the receptacle, it may be desirable to feed more air into the decaying material. For this purpose, the lid is adapted for turning through an angle of 180°, in which case the lid rests on several spacers 82 which are distributed over the circumference so that there is a gap between the edge of the receptacle and the lid. Also, in order to conduct away any condensation water that is formed, a drip ring 83 is also provided on the second side.

The dimensions of the receptacles can be so designed that several receptacles in the empty state can be stored inside one another. For this reason, the aeration device 79 is loosely affixed and the strips of the metal mesh can be kept in a flat state between the walls of the receptacle or on the base of the receptacle. For this reason, it is advisable to connect boards 70 with the help of slats 84 as shown in FIG. 14 because such a procedure permits handles 85 to be provided which fold down and do not hinder the stacking of the receptacles inside one another.

Figure 18:
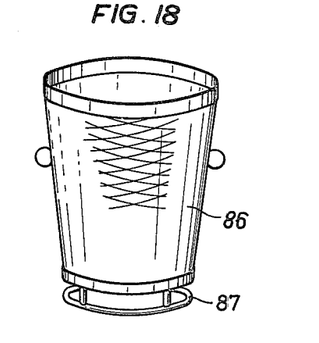
FIG. 18 is yet another embodiment of the apparatus of the present invention.

For decaying smaller quantities of pressings, the receptacle may have the shape of a bucket, as is shown in FIG. 18. With such a design, it is advisable to provide a ring 87 below the basket 86, the ring being at a distance from the base of the receptacle. Such a ring can be used as a handle when emptying the receptacle.

Figure 19:
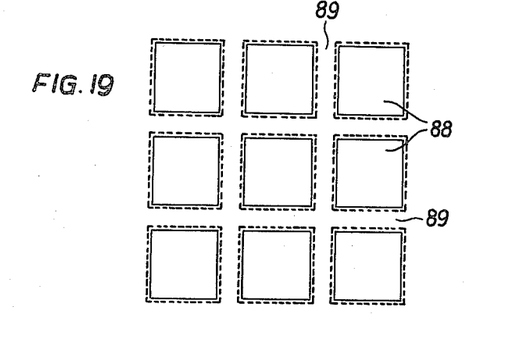
FIG. 19 is a diagrammatic representation of the apparatus of the present invention installed in a lettuce bed.

The equipment may, however, also have other designs. In FIG. 19, for instance, nine lettuce beds 88 are shown in plan view. These beds are fenced in with metal mesh according to the inventive arrangement. There is a lattice-shaped space 89 between the beds which is filled with the materials to be decayed. The beds 88 are covered with a suitable material, such as, glass plate or plastic film. A part of the heat formed goes into the beds. Most important, however, is that $CO_2$ enters the covered beds through the metal mesh and is immediately taken up by the plants. This leads to a surprisingly good growth of the plants in the beds.

It is preferable to make the boards of the receptacles, shown in FIGS. 14 to 16, 9.5 cm wide with a distance 72 between the boards of 0.5 cm. The internal dimensions of the receptacles can be $40 \times 40 \times 40$, $50 \times 50 \times 50$, $60 \times 60 \times 60$, $70 \times 70 \times 70$ and $80 \times 80 \times 80$ cm. These receptacles can be stacked inside one another so that a space of $90 \times 90 \times 90$ cm is required for storing the empty receptacles. With these dimensions, the lids can remain in place on the receptacles during storage. Such a set of receptacles has a capacity of about 1.25 $m^3$ and can hold more than 500 kg of grape marc.

In use, a vigorous aerobic decay sets in within a few days, whereby temperatures develop in the decaying material that are too high for the growth of pomace flies and which encompass all parts of the mass to be decayed since the walls of the receptacle do not permit a rapid transfer of heat to the outside. Any organic acids present are quickly degraded under these conditions, so that essentially only $CO_2$ and $H_2O$ which are both odorless, escape. Loss of moisture and heat is slowed down by the walls of the receptacle so that the initially vigorous decay is followed by a longlasting slow decay phase which also takes a good hold on the outer lying parts of the mass. The contents of the receptacles can be emptied in winter or at the beginning of spring, after the aeration device 79 has been previously removed.

The material obtained represents a high-grade fertilizer that may be used in vineyards or in orchards. If a uniform material is desired for the flower and vegetable garden, it is advisable to sieve the finer components of the fertilizer through a sieve with a 3 mm mesh width. To facilitate this process, the middle receptacle, with internal dimensions of $60 \times 60 \times 60$ cm, should receive a flat sieve whose external dimensions are $59 \times 45$ cm. The sieve should rest on the upper edge of the receptacle by means of casters affixed to the sides. It can easily be moved back and forth until it strikes against the inner walls of the receptacle. The fine material rapidly falls downwards as a result of the jolting. The sieve should be sufficiently flat that it can remain in the middle receptacle when all the empty receptacles are stored one inside the other.

The metal mesh may consist of aluminum or a steel that forms a protective patina layer.

If the $CO_2$ that is formed during the decay is to be used in greenhouses, bucket-shaped receptacles according to FIG. 18 are recommended. The internal diameter of the receptacle may be 40 cm in the area of the base and 45 cm at the edge. The tub may be 60 cm high.

In this receptacle also an aeration device 79 as shown in FIG. 14 should be set up. This device may consist, for example, of two strips 12 cm wide. The base of the bucket consists of sheet metal on which the metal mesh is lying. The lid of such receptacles is constructed similarly as described in connection with FIGS. 14 to 16.

Approximately 30 cm wide metal mesh is used for fencing the beds. It is kept in a vertical position with the help of posts. The distance between fenced beds can be 60 cm and the length of the beds about 2.4 m. The space between is filled with grape marc and the beds are covered with a plastic film. The space between the beds which is filled with marc, is, however, not covered.

Experiments with winter lettuce have shown that the heat which develops as the marc decays leads to a small increase in temperature of the covered beds and promotes growth. A greater effect is, however, exerted by the $CO_2$, which is formed by the decay and which enters the covered spaces through the metal mesh walls and which is taken up by the plants. Measures to protect the plants proved to be unnecessary, since, in contrast to greenhouses, no long, warm phases developed in which night snails, aphids and the like, occur. Lettuces were obtained in the inventive installation which were not only particularly large, but which also were of particularly high quality with even the outermost leaves being usable. In other respects, the maturity of the winter lettuce was attained a few weeks earlier than with the hitherto used outside growing methods.

What is claimed is:

1. A process for the preparation of a high grade fertilizer from organic materials comprising storing pressing residues obtained from wine and fruit juice production temporarily under anaerobic conditions and then loosely mixing the residues with air to produce a mass whereby intense aerobic degradation takes place to produce heat, carbon dioxide and moisture and a finely divided high quality fertilizer and wherein any seeds and pits are separated from the decayed residues and the separated seeds and pits are ground and then subjected to aerobic decay.

2. The process of claim 1 wherein water is added to the loosely mixed residues to keep them moist.

3. The process of claim 1 wherein the moisture produced from the aerobically decaying residues is collected, condensed, and returned to the loosely mixed residues to keep them moist.

4. The process of claim 1 wherein the heat produced by the aerobically decaying residues is used for heating a building.

5. The process of claim 1 wherein the carbon dioxide produced by the aerobically decaying residues is collected and used to control the atmosphere above growing plants.

6. The process of claim 1 wherein the heat produced is used to heat water.

7. The process of claim 1 wherein the heat produced is used to heat a hothouse.

8. The process of claim 1 wherein the carbon dioxide produced is supplied to a hothouse to control the atmosphere therein.

9. The process of claim 1 wherein periodically new feed material selected from the group consisting of pressing residues and pressing residues which have been temporarily subjected to storage under anaerobic conditions are added to the mass.

10. The process of claim 9 wherein the periodic interval is from one to several weeks.

11. The process of claim 1 wherein prior to separation of the seeds and pits, the residues are dried.

* * * * *